United States Patent [19]

Benson

[11] Patent Number: 4,545,705

[45] Date of Patent: Oct. 8, 1985

[54] INSERT RETAINING APPARATUS

[75] Inventor: Lloyd R. Benson, Houston, Tex.

[73] Assignee: Triangle Grinding Inc., Houston, Tex.

[21] Appl. No.: 526,055

[22] Filed: Aug. 23, 1983

[51] Int. Cl.⁴ ............................................. B26D 1/00
[52] U.S. Cl. ..................................... 407/108; 407/77; 407/113
[58] Field of Search .................. 407/107, 108, 113, 77

[56] References Cited

U.S. PATENT DOCUMENTS

| Re. 26,168 | 3/1967 | Lundgren | 407/77 |
| 1,396,180 | 11/1921 | Fors | 407/108 |
| 2,537,837 | 1/1951 | Labrozzi et al. | 407/107 |
| 2,936,679 | 5/1960 | Thuerwachter | 407/107 |
| 3,754,309 | 8/1973 | Jones et al. | 407/77 |
| 3,911,543 | 10/1975 | Sorice | 407/77 |
| 3,934,320 | 1/1976 | McCreery | 407/107 |
| 4,028,782 | 6/1977 | Standak | 407/113 |
| 4,035,887 | 7/1977 | Hertel | 407/107 |
| 4,360,297 | 11/1982 | Weber | 407/113 |
| 4,400,117 | 8/1983 | Smith | 407/49 |

Primary Examiner—Leonidas Vlachos
Assistant Examiner—Jerry Kearns
Attorney, Agent, or Firm—Wenderoth, Lind & Ponack

[57] ABSTRACT

A tool holder has a pocket formed therein into which a cutting insert is mounted by a clamp and fastening means. The cutting insert has a wedge shaped recess which extends from the outside surface of the insert and intersects with the upper surface along a line substantially equidistant from the outside surface. The clamp includes two leg portions, the first leg portion being retained in a recess formed in the tool holder and the second leg portion being inserted in and complementary to the wedge shaped recess of the insert. Initial and secondary restraining forces are exerted on the insert when the clamp is fastened to the tool holder.

6 Claims, 8 Drawing Figures

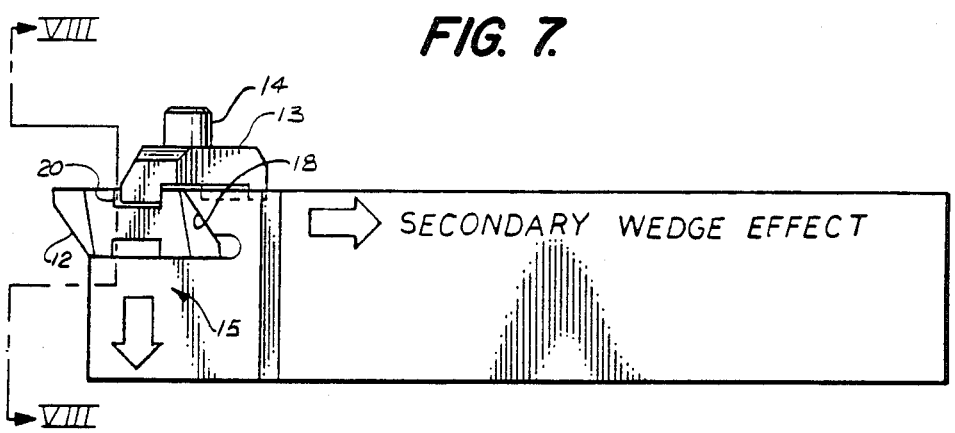

INSERT RETAINING APPARATUS

INTRODUCTION

This application relates to a cutting tool and, more particularly, to a cutting tool for threading and grooving operations.

BACKGROUND OF THE INVENTION

Double ended invertible inserts have been used in cutting tools for internal and external threading and grooving operations. In such systems, a clamp is provided for the tool holder which clamp is located on the top portion of the tool holder thereby removing it from interference with the workpiece.

In such systems, the cutting insert is subjected to high downwardly and laterally extending loads from the workpiece. Because of the rigidity needed for close tolerance operations, it is imperative that the insert be held in the tool holder without play.

One such system presently in use is disclosed in U.S. Pat. No. 3,754,309 (Jones et al). This system uses a diagonal notch machined in a double ended insert and a two legged clamp, one of the legs being secured by a recess in the tool holder and the other leg being of rounded configuration and acting within the diagonal notch. Force is applied to the clamp and, consequently, the insert by the tightening action of a cap screw between the clamp and the tool holder.

Such system is, however, disadvantageous in that it can lead to a loosening of the insert in the pocket thereby necessitating a rework or scrapping of the workpiece. Further, it is essential in such device that the insert be firmly positioned in the holding pocket prior to tightening the clamp. This is so because the point loading caused by the rounded leg of the clamp against the non-precision notch of the insert creates forces that do not necessarily direct the insert into the innermost position within the pocket of the tool holder.

SUMMARY OF THE INVENTION

According to one aspect of the invention, there is disclosed a securing system for a cutting tool comprising.

According to the invention, there is disclosed a securing system for a cutting tool comprising a tool holder, a pocket in said tool holder defined by a first sidewall, a bottom wall and a rear wall, a cutting insert receivable by said pocket and defined by an outside surface, an upper surface and an inner sidewall surface, a clamp operable to hold said insert in said pocket and connection means to connect said clamp to said tool holder, said insert having a recess defined by a diagonal wedge shaped face extending from said outside surface to said upper surface and a rearwardly located planar surface extending downwardly from said upper surface and terminating at said wedge shaped face, said clamp having a first wedge portion complementary to said wedge shaped face and a second planar portion complementary to said rearwardly located planar surface of said recess and being operable when connected to said tool holder to exert a fastening force on said wedge shaped face and said rearwardly located planar surface of said recess of said insert to seat said insert against said sidewall, bottom wall and rear wall.

BRIEF DESCRIPTION OF THE SEVERAL VIEWS OF THE DRAWINGS

An embodiment of the invention will now be described, by way of example only, with reference to the accompanying drawings in which:

FIG. 7 is a side view of the tool holder and cutting insert of FIG. 2 illustrating the clamping force effect.

DESCRIPTION OF SPECIFIC EMBODIMENT

Figure 1:
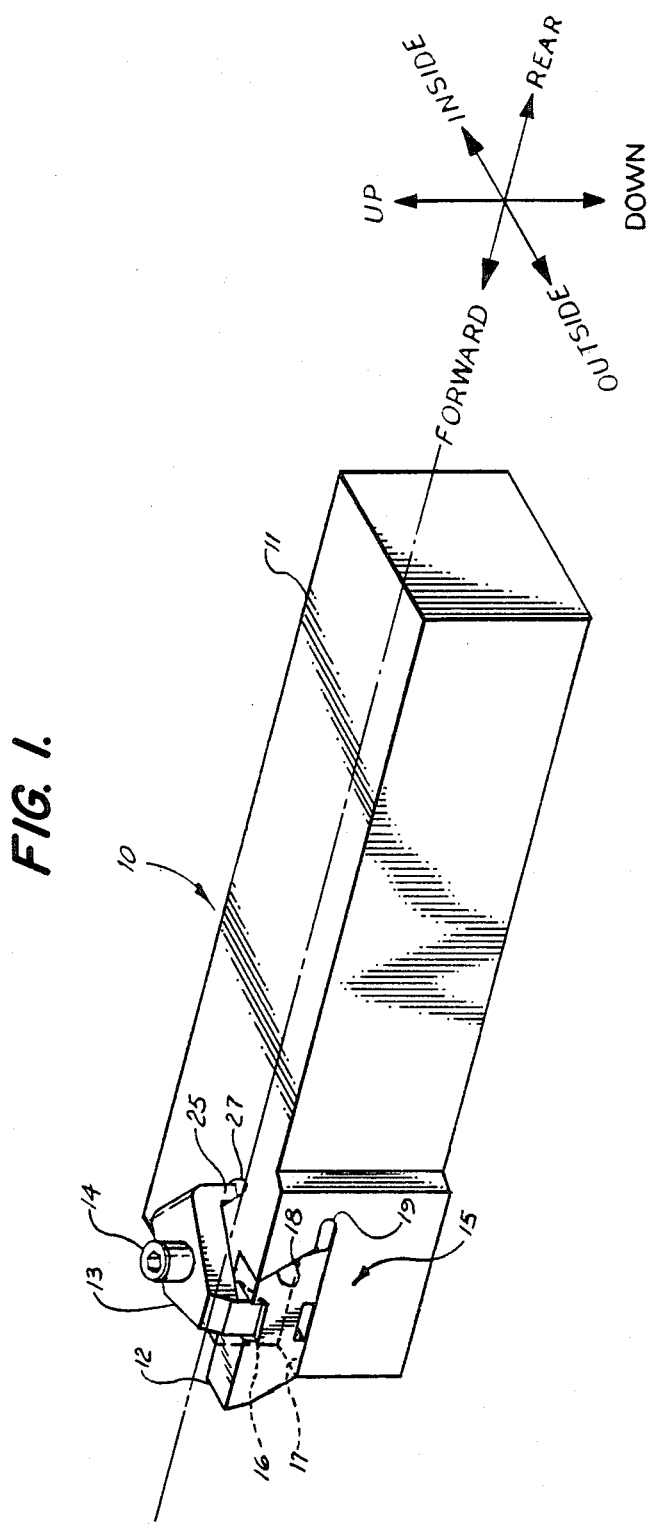
FIG. 1 is a perspective assembled view of the tool holder and cutting insert.

Referring now to the drawings, an assembled cutting tool is shown generally at 10 in FIG. 1. It consists of the tool holder or bar 11, a cutting insert 12, a clamp 13 and a fastening means in the form of a socket head cap screw 14.

A pocket generally shown at 15 is machined in tool holder 11. The pocket 15 consists of first sidewall 16, a bottom wall 17 and a rear wall 18. A stress relief diameter 19 is machined in the rear wall 18 and extends inwardly to the first sidewall 16. It is noted that the directions, "inwardly", "outwardly", etc. are used throughout this specification in the sense that those directions are as indicated in FIG. 1.

Figure 5:
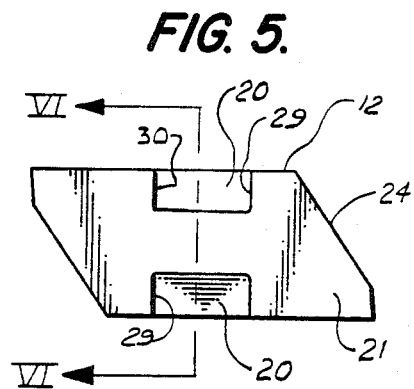
FIG. 5 is a side view of the cutting insert as seen along VIEW V in FIG. 2.
Figure 6:
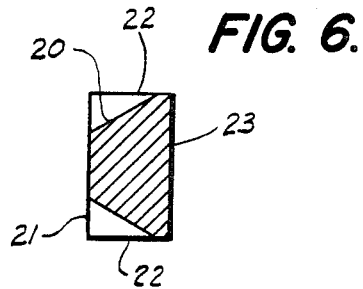
FIG. 6 is a cutaway view taken along VI—VI of FIG. 5.

The cutting insert 12 is shown more clearly in FIGS. 5 and 6. It comprises a carbide material with a wedge shaped recess 20 machined on both the upper and lower surfaces for invertibility purposes. Because of symmetry, only the upper recess will be described. The recess 20 is in the form of a diagonal wedge shaped planar face and extends from the outside surface 21 to the upper surface 22 of the cutting insert 12. The inner sidewall surface 23 of cutting insert 12 extends rearwardly from the forward wall and terminates at the rear wall 24 of the cutting insert 12. The rear surface 24 of the insert 12 is machined on an angle such that it will fit the rear wall 18 of the pocket of the tool holder 11. The recess 20 is also defined by forwardly and rearwardly located planar surfaces 20, 30 extending perpendicularly downwardly from the upper surface 22 of the cutting insert 12. These areas form the forward and rearward boundaries of the recess 20.

Figure 3:
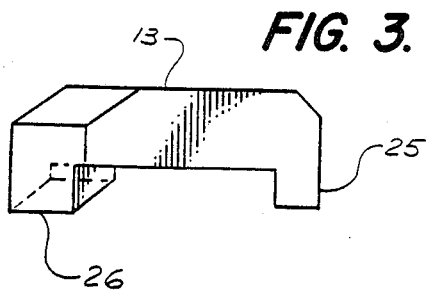
FIG. 3 is a side view of the clamp as seen along VIEW III in FIG. 2.
Figure 4:
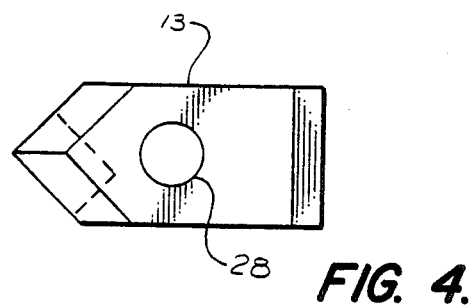
FIG. 4 is a plan view of the clamp of FIG. 3.
Figure 8:
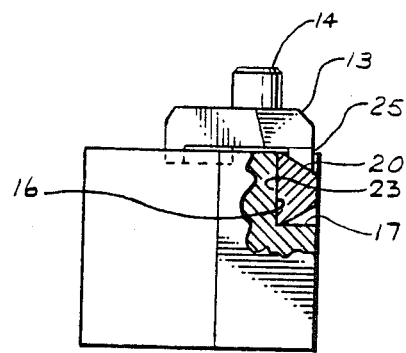
FIG. 8 is a partial cutaway view taken along VIII—VIII of FIG. 7.

The clamp 13 is shown more clearly in FIGS. 3 and 4. It includes a first and second leg portion 25, 26 respectively. First leg portion 25 is machined to fit a recess 27 (FIG. 1) in tool holder 11. Second leg portion 26 is machined in the shape of a wedge which is complementary to the wedge shaped face of recess 20 of cutting insert 12 as best seen in FIG. 8. A diameter 28 is drilled through clamp 13 and serves to allow insertion of socket head cap screw 14 to a threaded connection (not shown) in tool holder 11.

OPERATION

Figure 2:
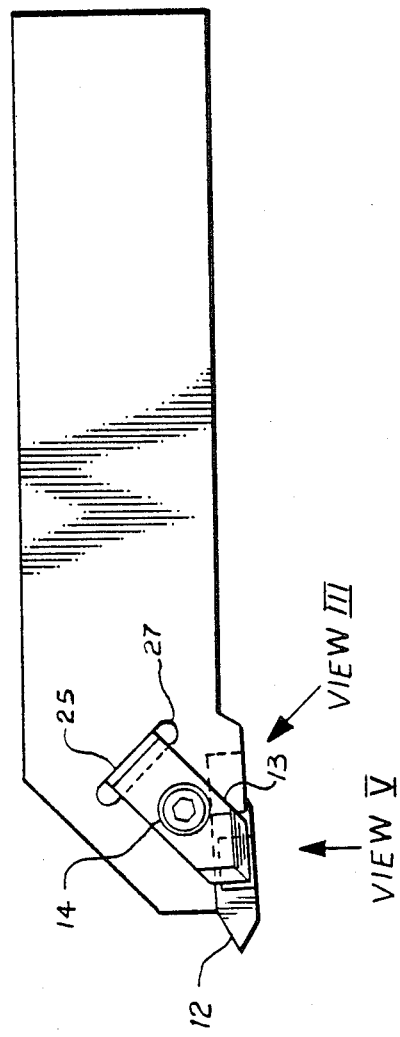
FIG. 2 is a plan view of the tool holder and cutting insert of FIG. 1.

Referring to FIGS. 2, 7 and 8, the appropriate cutting insert 12 is inserted in pocket 15 and the clamp 13 is positioned with the first leg portion 26 on recess 20 of insert 12 and the second leg portion 25 in recess 27 of tool holder 11. Socket head cap screw 14 is inserted through diameter 28 (FIG. 4) and into the threaded connection (not shown) in tool holder 11. Socket head cap screw 14 is then tightened.

As the tightening action proceeds, the cap screw 14 will force the first leg portion 26 downwardly since second leg portion 25 is flush with the bottom of recess 27. First leg portion 26 will therefore apply a force on the recess 20 of insert 12 in the sense shown in FIG. 8. This is the primary restraining force created.

As the tightening continues, the first leg portion 26 will contact the rearwardly located planar surface 29 (FIG. 5) of the recess 20 and a secondary restraining or wedge effect will occur as depicted in FIG. 7. Thus, the tightening will move the insert 12 inwardly, rearwardly and downwardly in the pocket 15 of tool holder 11.

When the tightening is complete, the cutting insert 12 will be held securely in the pocket 15 with the first sidewall 16 of the tool holder 11 in firm contact with the inner sidewall surface 23 of the insert 12, the rear surface 24 of the insert 12 in firm contact with the rear wall 18 of the tool holder 11, and the lower surface 22 in firm contact with the bottom wall 17 of the pocket 15.

Different cutting inserts may be used depending on the particular cutting tool application being considered. For example, the insert 12 depicted in FIG. 2 may be used for threading operations while the insert depicted in FIG. 1 may be used for grooving operations.

The insert 12, as mentioned, is symmetrical about an axis perpendicular to the outside surface 21. Thus, the insert 12 is invertible upon a 180° rotation of the insert 12 about the axis.

The specific embodiments and modifications described are by way of illustrative example only and should not be construed as limiting the scope of the invention as defined in accordance with the accompanying claims.

I claim:

1. A securing system for a cutting tool comprising a tool holder, a pocket in said tool holder defined by a first sidewall, a bottom wall and a rear wall, a cutting insert receivable by said pocket and defined by an outside surface, an upper surface and an inner sidewall surface, a clamp operable to hold said insert in said pocket and connection means to connect said clamp to said tool holder, said insert having a recess defined by a diagonal wedge shaped face extending from said outside surface to said upper surface and a rearwardly located planar surface extending downwardly from said upper surface and terminating at said wedge shaped face, said clamp having a first wedge portion complementary to said wedge shaped face of said insert and a second planar portion complementary to said rearwardly located planar surface and being operable when connected to said tool holder to exert a fastening force on said wedge shaped face and said rearwardly located surface of said recess of said insert to seat said insert against said sidewall, bottom wall and rear wall.

2. A securing system as in claim 1 wherein said cutting insert is further defined by a rear surface located adjacent said rear wall of said pocket.

3. A securing system as in claim 2 wherein said clamp is operable to bring said inner sidewall and rear surfaces of said insert into contact with said first sidewall and said rear wall of said pocket, respectively.

4. A securing system as in claim 3 wherein said clamp is operable to exert inwardly, rearwardly and downwardly directed retaining forces on said wedge shaped face when said clamp is connected to said tool holder.

5. A securing system as in claim 2 wherein said insert is substantially symmetrical about an axis located centrally in and perpendicular to said outside surface.

6. A securing system as in claim 5 wherein said insert is invertible in said pocket upon a 180° rotation of said insert about said axis.

* * * * *